(12) United States Patent
Coq

(10) Patent No.: US 12,423,629 B1
(45) Date of Patent: Sep. 23, 2025

(54) SUPPLEMENTAL SERVICE RECOMMENDATION SYSTEM

(71) Applicant: Nicolas Anthony Coq, Coral Springs, FL (US)

(72) Inventor: Nicolas Anthony Coq, Coral Springs, FL (US)

(*) Notice: Subject to any disclaimer, the term of this patent is extended or adjusted under 35 U.S.C. 154(b) by 159 days.

(21) Appl. No.: 18/378,942

(22) Filed: Oct. 11, 2023

(51) Int. Cl.
  *G06Q 10/0631* (2023.01)
  *G06Q 20/10* (2012.01)
  *G06Q 30/0601* (2023.01)

(52) U.S. Cl.
  CPC ..... *G06Q 10/063112* (2013.01); *G06Q 20/10* (2013.01); *G06Q 30/0633* (2013.01); *G06Q 30/0641* (2013.01)

(58) Field of Classification Search
  None
  See application file for complete search history.

(56) References Cited

U.S. PATENT DOCUMENTS

| | | | |
|---|---|---|---|
| 7,069,333 B1* | 6/2006 | Morris | G06Q 10/06 709/224 |
| 7,912,744 B2* | 3/2011 | Combs | G06Q 10/06 701/472 |
| 8,948,732 B1 | 2/2015 | Negahban | |
| 10,553,119 B1 | 2/2020 | Shah | |
| 11,681,955 B2* | 6/2023 | Bright | G06Q 10/02 705/5 |
| 2004/0260602 A1* | 12/2004 | Nakaminami | G06Q 10/0639 705/7.29 |

FOREIGN PATENT DOCUMENTS

WO  WO-2007095370 A2 *  8/2007  ............ G06Q 10/10

OTHER PUBLICATIONS

Korbut, Daniil, "Recommendation System Algorithms", Recommendation System Algorithms—Stats and Bots, Downloaded Oct. 4, 2018 from https://blog.statsbot.co/recommendation-system-algorithms-ba67f39ac9a3, 8 pages (Year: 2018).*

* cited by examiner

*Primary Examiner* — Romain Jeanty
(74) *Attorney, Agent, or Firm* — Sanchelima & Associates, P.A.; Jesus Sanchelima; Christian Sanchelima

(57) ABSTRACT

A supplemental service recommendation system that enables roadside assistance via crowdsourcing. Registered members store their data in the cloud-based server, facilitating efficient assistance requests for clients, providers, and participating shops via a software program such as an app. Geographical correlation and algorithmic analysis of the database ensure seamless matching for the most suitable assistance service. Users can track the approaching service provider in real-time. The system incorporates a secure payment method, enabling users to make direct payments within the platform. With enhanced data utilization and convenient payment options, this system optimizes roadside assistance, fostering a reliable and swift user experience.

10 Claims, 9 Drawing Sheets

SUPPLEMENTAL SERVICE RECOMMENDATION SYSTEM

1. OTHER RELATED APPLICATIONS

The present application is a U.S. Non-Provisional Patent Application claiming priority of U.S. Provisional Patent Application, Ser. No. 63/441,835 filed on Jan. 29, 2023, which is hereby incorporated by reference.

2. FIELD OF THE INVENTION

The subject invention is related to a roadside assistance software. The system matches individuals in need with qualified service providers promptly. By seamlessly connecting users with the right resources, the system ensures efficient and reliable road assistance support, enhancing safety and convenience for all participants in real time. Specifically, it is related to a system that connects users to an optimal array of service providers using artificial intelligence, comprising computerized device in communication with a server via a network. The server contains a plurality of databases and modules. For instance, a probability module uses an artificial intelligence database to match service providers of the service providers database with members of the members database based on the requested service and historical data. The service provider's application uses a wireless module to detect available tools in the assistance kit and communicates the information to the server. Recommending supplemental services based on the historical data stored in the event database and predetermined conditions. Identifying through the location area dangerous inconvenient or hazardous areas or conditions based on a predetermined issue, types, and geographical area relationships stored in the geographical correlation database, the geographical correlation database also includes the locations of each of the members and the services providers. The services provided by the service provider to the user could be air for the tire, tire repair, jumpstart, gas for the engine, oil for the motor, towing, etc.

2. DESCRIPTION OF THE RELATED ART

Several designs for supplemental service recommendation systems have been designed in the past. None of them, however, incorporate a real-time matching system for clients, providers, or participating shops. The system utilizes a cloud server to store a comprehensive database of each profile, enabling seamless assistance requests and provision as needed. The system matches the client, provider, and shop to recommend a suitable service for each request based on geographical correlation, historical data, member data, and specifications. Additionally, the system integrates a secure and efficient payment method, allowing for immediate payment at the moment of service, enhancing and facilitating the overall service experience.

Applicant believes that a related reference corresponds to U.S. Pat. No. 8,948,732 that disclose a roadside assistance program comprising a software for storing user/service provider data. The user initiates the request of assistance and the system selects a particular service provider based on the geographic location of the user. The user can register on the software using the details of the vehicle or personal details. References further disclose machine learning instructions may correlate an automobile description with a particular service (towing device or tire repair) and generates a recommendation for service.

Applicant believes that another related reference corresponds to U.S. Pat. No. 10,553,119 which disclosing a roadside assistance system comprising a road assistance server comprising a memory, vehicle interface, roadside assistance service engine, machine learning engine, historical road service database, membership data, and onboarding engine. The roadside assistance service engine may communicate with a roadside assistance service device and notify that the user is requesting assistance. The roadside assistance service engine sends location data of the vehicle, the type of service needed for the vehicle, and/or information about the vehicle. The onboarding engine may provide enrollment and payment functionality to an application that interacts with the roadside assistance server. The membership data contains the record of the user enrolled with the server. The roadside assistance system generates a recommendation for a service and may transmit the generated recommendation to a user based on the artificial intelligence algorithm. The service may be a vehicle repair service (e.g., repair of flat tire, brakes, jumpstart, etc.), or other service such as a vehicle towing service. The service recommendations are sent based on historical roadside service data. The user from the application request for assistance based on vehicle conditions. The system determines the number of service providers that may perform roadside service to the user that made.

None of these references, however, teach of a real-time matching system for clients, providers, or participating shops. The innovative system utilizes a cloud server to store a comprehensive database of each profile, enabling seamless assistance requests and provision as needed. Users can easily track and locate suitable clients, providers, or shops based on specific capabilities required, eliminating the necessity for membership fees and reducing reliance on unique and specialized provider services. This groundbreaking approach revolutionizes the road assistance industry, enhancing accessibility, and streamlining the entire process for all parties involved.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a real-time matching system that ensure quick and accurate connections between clients, providers, and participating shops, leading to faster assistance requests and seamless service provision.

It is other object of the present invention to provide a system that matches users with qualified service providers who has assistance kits most related to the needs of the users.

It is another object of this invention to provide an app connected to a cloud-based database integrating an advanced matching algorithm, where users can access a wealth of relevant information about providers and participating shops, making it easier to select the most suitable service.

It is another object of the present invention to integrate a secure payment module to enable the user to make payments directly within the app, eliminating membership fees or cash transactions.

It is still another object of the present invention to detect recurring patterns in service requests within specific geographic regions. As a result, the system can proactively notify local authorities or alert clients about potential recurrent issues reported within their current geographical location, facilitating appropriate action.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Figure 1:
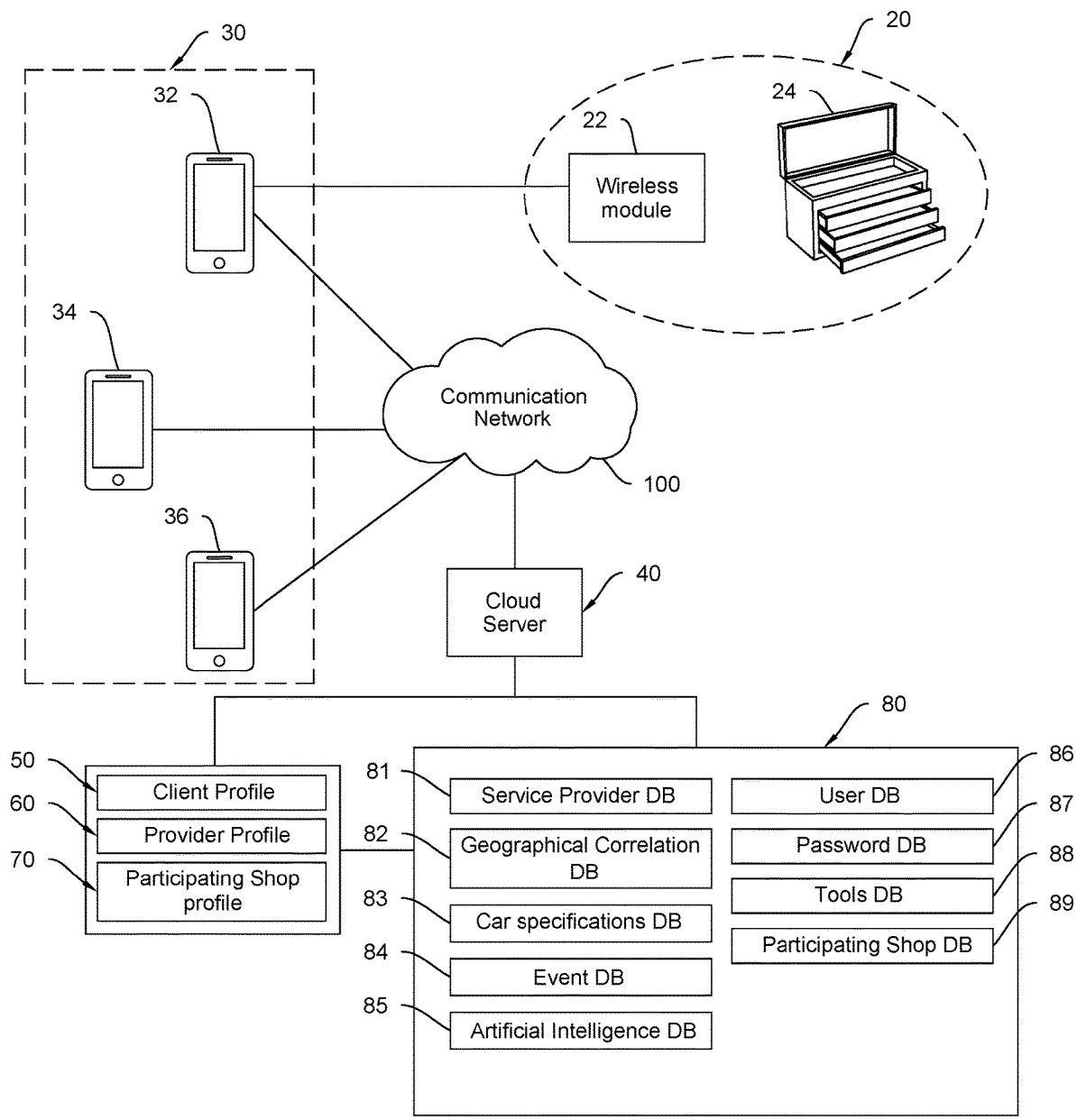
FIG. 1 represents a network connection diagram between the Communication Network 100, the hardware assembly 20, and the Cloud-based Server 40.

Referring now to the drawings, where the present invention is generally referred to with numeral 10, it can be observed that it basically includes a hardware assembly 20, computerized devices 30, a cloud-based server 40, a Client profile 50, a Provider Profile 60, a Participating Shop Profile 70, a database assembly 80, and a communication network 100. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
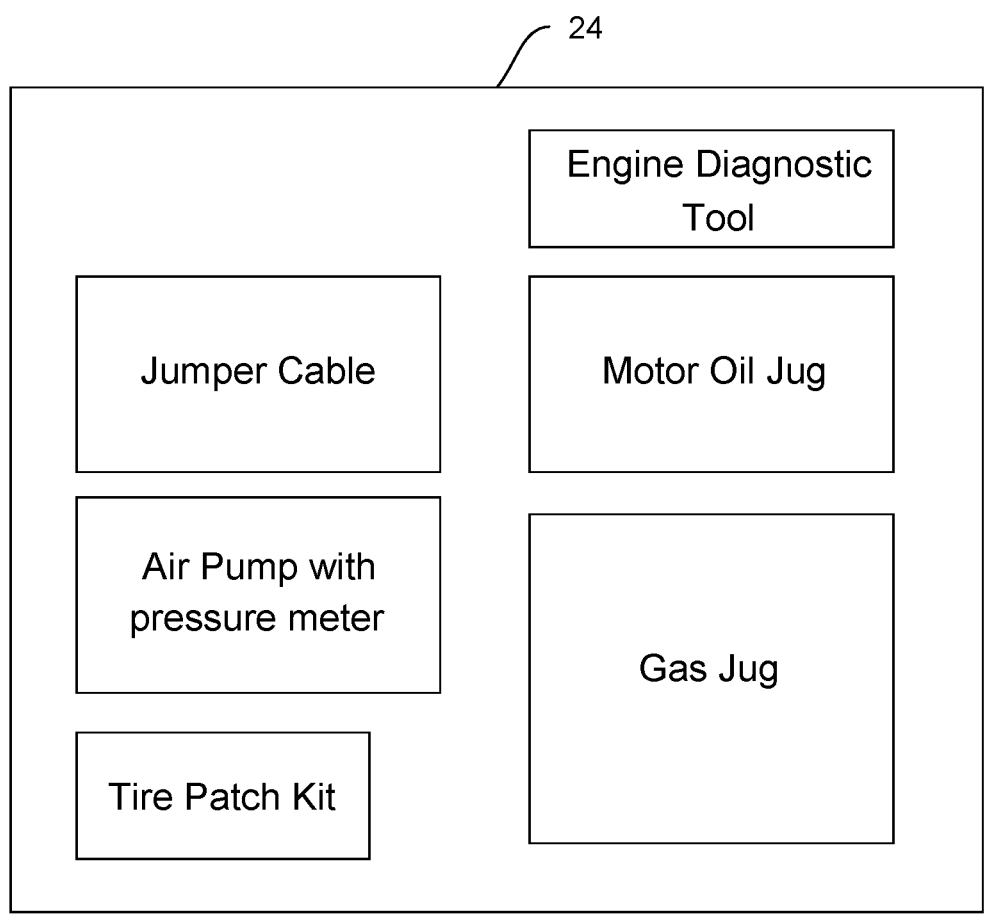
FIG. 2 is an schematic of the assistance kit 24.
Figure 3:
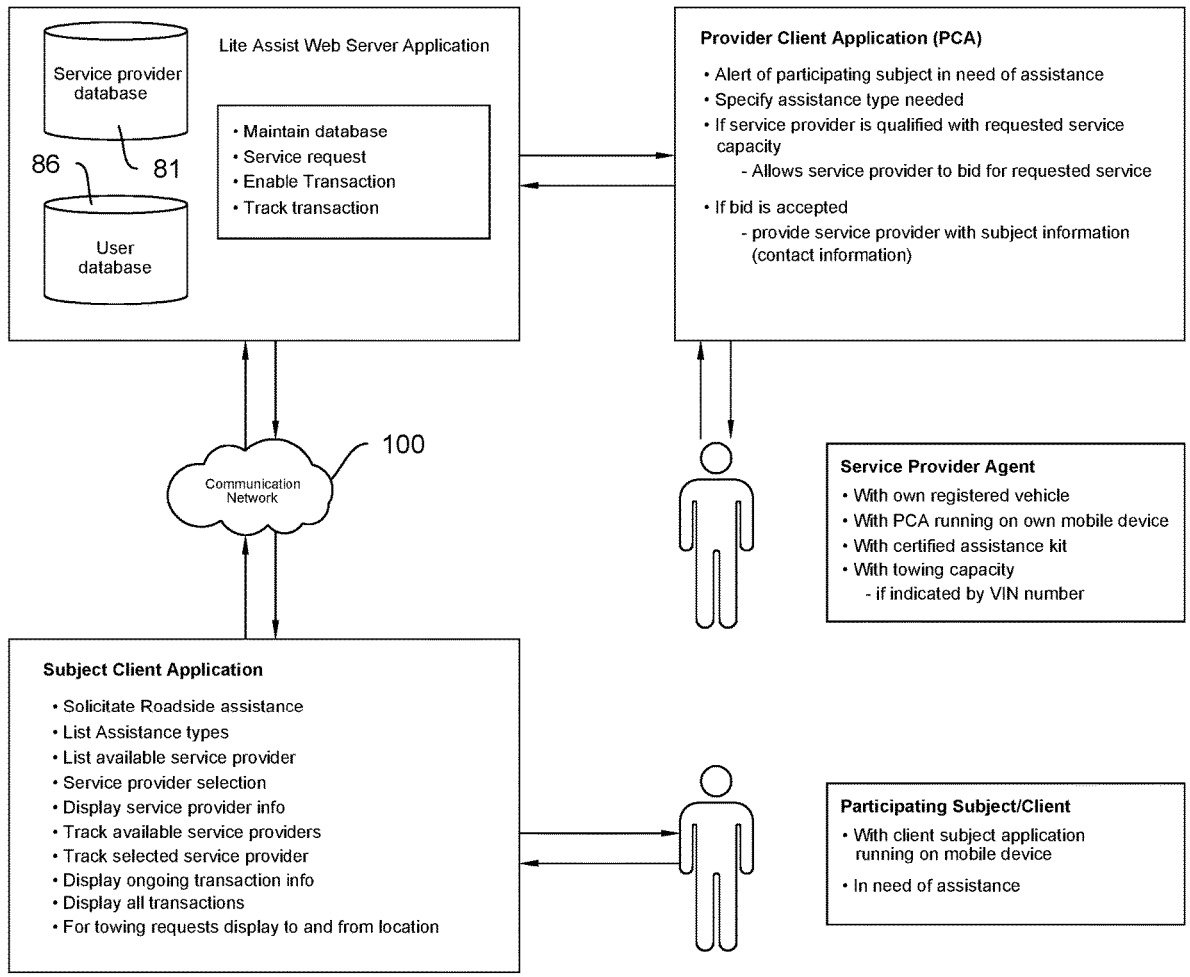
FIG. 3 is an schematic diagram of the implementation of the present invention according to an exemplary embodiment thereof.

As depicted in exemplary embodiment of FIG. 1, the present invention may include computerized devices 30 such as smartphones, tablets, laptops, or any other suitable device as known in the art; wherein the computerized devices 30 are capable of running a user interface (UI). In a preferred embodiment, the computerized devices 30 may include a client's computerized device 32, a provider's computerized device 34, and participating shop's computerized device 36, nonetheless, it should be understood that in other embodiments, the computerized devices may be any other suitable computerized console capable of performing complex tasks and computations as known in the art; furthermore, any other suitable device can be used on client's end, provider's end and participating shop's end. Said computerized devices 30 may be in continuous communication with a cloud-based server 40 through the communication Network 100. Wherein said cloud-based server stores the system's software. The present invention may include a hardware assembly 20 having a wireless module 22 and an assistance kit 24. The wireless module 22 may enable communication between client/user, provider and participating shop. The assistance kit 24 may be constituted with a set of tools suitable for a service provider to provide roadside assistance, particularly for scenarios in which heavy equipment-like a tow truck—may not be necessary. The embodiment of FIG. 2, showcases tools that may form the assistance kit 24 such as a wireless detection module, jumper cables, an air pump with pressure meter, a motor oil jug, a tire patch kit, flare sticks, a gas jug, an engine diagnostic tool; it should be understood that the aforementioned tools are hereby presented not in a limiting sense, but for explanatory purposes. In other embodiment the assistance kit 24 may include other suitable tools to meet various necessities for different types of vehicles such as electric or hybrid ones and for addressing basic or special car damages. It should be noted that the wireless module of the assistance kit 24 may allow the unit to be detected by the provider client application. In alternative embodiments, the wireless module 22 may use technology such as Wi-Fi, Bluetooth tethering, USB tethering, RF/ID and/or any other suitable technology from the state-of-art to detect what tools are available in the assistance kit 24. For instance, RFID tags can be attached to each tool within the kit, the wireless module 22 may emit RFID signals, and each tag may respond with a unique identifier, wherein by analyzing the responses, the module can determine which tools are present and their identities. In another instance, NFC tags can be embedded on or near each tool's storage location within the kit, wherein the wireless module 22 may have NFC capabilities to scan the tags, so that when a tool is removed or placed back into the kit, the NFC tag interactions are recorded, thereby the wireless module 22 can then maintain an updated tool inventory based on these interactions. Furthermore, should tow services may be required the provider may render such a service as indicated by vehicle identification number (VIN)

The aforementioned UI is going to be described in three main embodiments: client UI 500, provider UI 600 and shop UI 700, which may be run on said client's computerized device 32, a provider's computerized device 34, and participating shop's computerized device 36, accordingly. Upon establishing a link with the communication network 100 said client's computerized device 32, a provider's computerized device 34, and participating shop's computerized device 36, a digital ecosystem may be defined. This ecosystem transmits service requests, tool availability, location data, and other pertinent details to the cloud-based server 40, fostering a continuous stream information. It should be considered that the communication network 100 acts as a bridge, and the cloud-based server 40 acts as a centralized repository, storing and processing the accumulated data from the Data assembly 80. As FIG. 1 illustrates, such an integration may allow for profile management, service matching and task location. In a preferred embodiment, through the network connectivity, the cloud-based server 40 may access and reference a client profile 50, a provider profile 60, and a participating shop profile 70. This information is displayed in modules through the UI 500, UI 600, and UI 700 of the corresponding computerized device.

Figure 4:
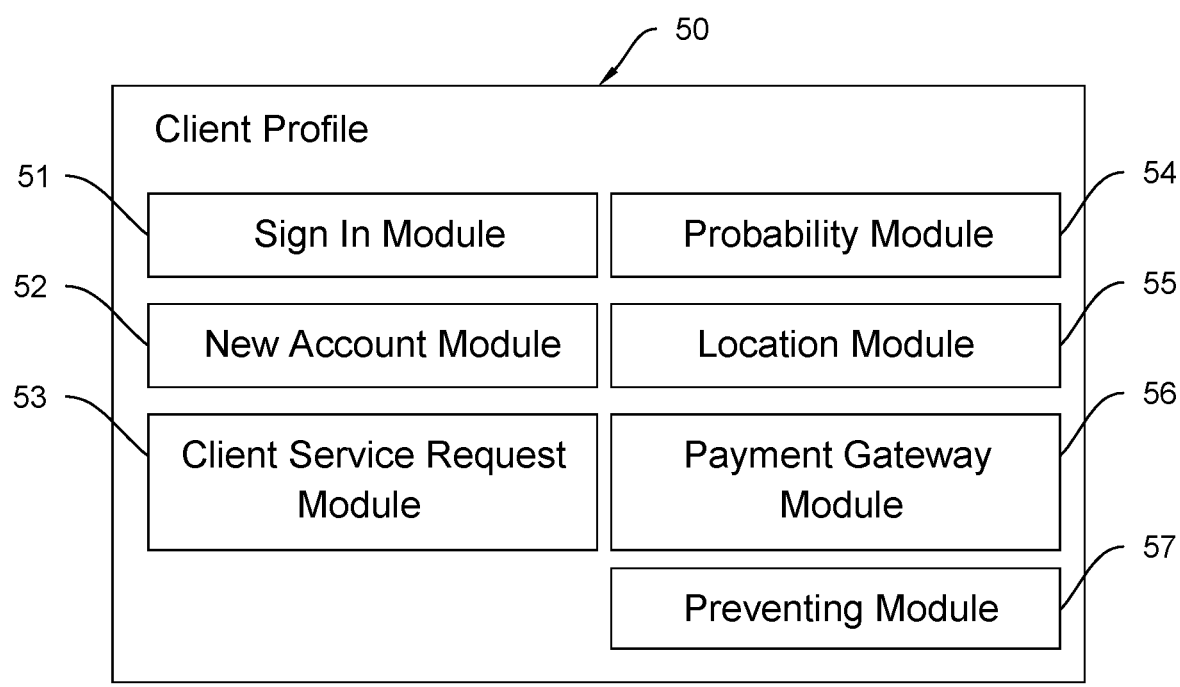
FIG. 4 shows an overview of the modules comprising the Client Profile 50.
Figure 4A:
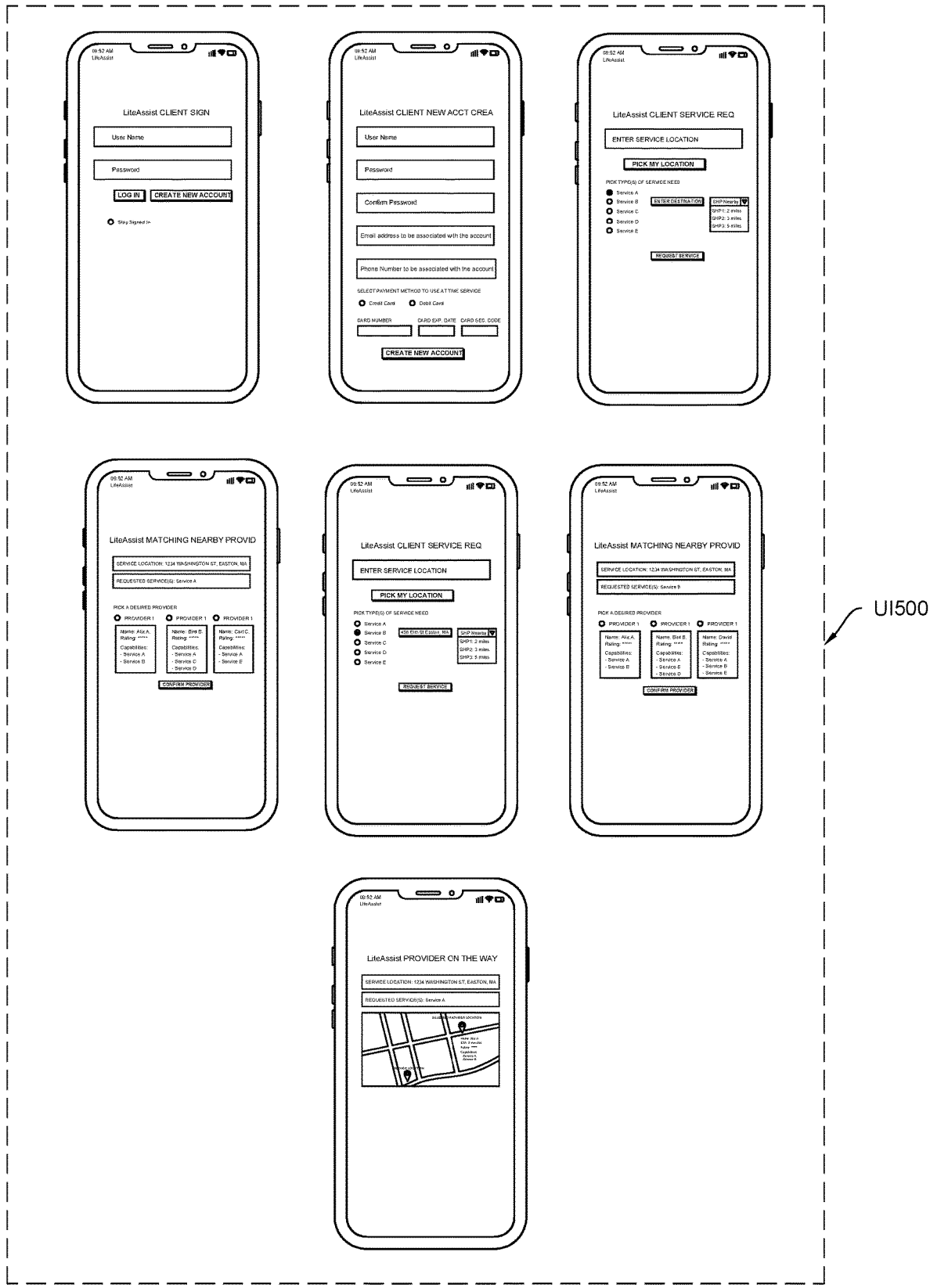
FIG. 4A illustrates various embodiments of a mobile app user interface UI 500 in accordance with an embodiment of the present invention 10.

FIG. 4 illustrates the integration of the sign in module 51, new account module 52, client service request module 53, probability module 54, location module 55, and payment gateway module 56 within the framework of the client profile 50. FIG. 4A illustrates an example mobile app user interface in accordance with UI 500 of the present invention 10 in which illustrates the Sign In Module 51 for a prospective client may create a new account, or a participating client may log in, wherein the information entered from the prospective client and the participating client is stored in User Database 86. FIG. 4A also depicts an example mobile app user interface of UI 500 which depicts the New Account Module 52, where a registering client enters the new account information, including payment method to be used at time of service through the Payment Gateway Module 56. FIG. 4A shows an example mobile app user interface of UI 500 in which Client Service Request Module 53 is shown, this module a participating client enters information with respect to the service needed, a location of the needed service. The participating client has the option of picking a geographical location. FIG. 4A represents an example mobile app user interface of UI 500 which Probability Module 54 list the matching providers found from the Service provider Database 81 nearby the geographical location selected in Client Service Request Module 53. For each provider found, the rating and list of capabilities are displayed. The client may select the desired provider and confirm. Furthermore, the probability module 54 may be used to determine the best provider with any incoming requests. Said matching algorithm 54 may use machine learning techniques such as artificial neural networks, classical learning, reinforcement learning, ensemble learning, or the like, to compare the service requested by the client through the client service request module 53 and data from the service provider database 81 to then match the client with a suitable service provider from the service provider database 81. Using module 53, the participating client enters information regarding the service needed, as well as the location of the needed service. The client has the option of picking the current location. An alternative service may be selected, where the client enters a desired destination location or pick up a destination suggested from a list of a Participating Shop Database 89 located nearby. FIG. 4A illustrates an example mobile app user interface of UI 500 where the list of matching providers with the alternative service requested in Client Service Request Module 53 are listed. For each provider found, the rating and list of capabilities is displayed. The client may select the desire provider and confirm. FIG. 4A illustrates an example mobile app user interface of UI 500 where the participating client is able to track the provider on the way to the requested service location using the location module 55. In a preferred embodiment, UI 500 may be part of a software program stored in a cloud-based store, such as apple store, google play store, or any other website for app storing.

Figure 5:
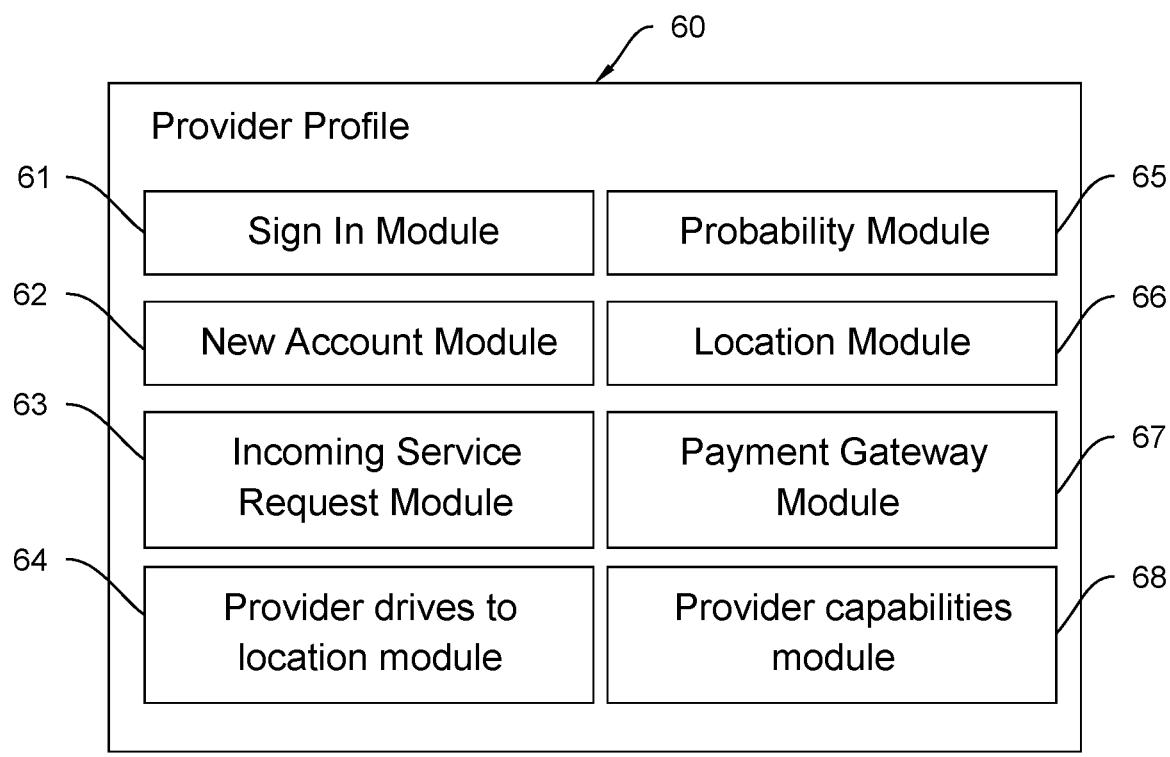
FIG. 5 depicts an overview of the modules comprising the Provider Profile 60.
Figure 5A:
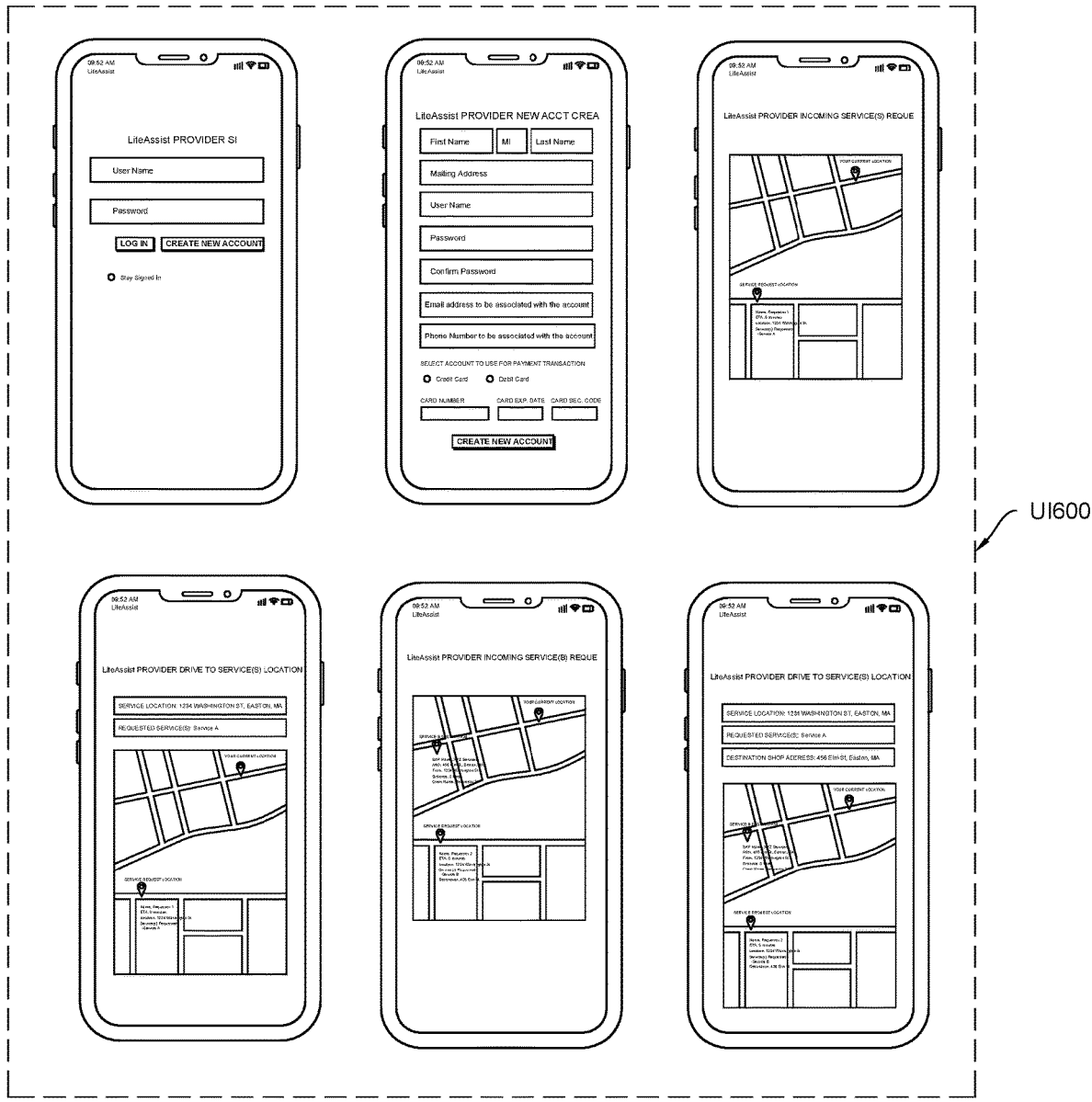
FIG. 5A depicts a mobile app user interface UI 600 in accordance with an embodiment of the present invention 10.

Referring to the FIG.s and more particularly to FIG. 5, the integration of Sign In Module 61, New Account Module 62, Incoming Service Request Module 63, Provider drives to location module 64, Probability Module 65, Location Module 66, Payment Gateway Module 67, and Provider capabilities module 68 within the Provider Profile 60 is shown. FIG. 5A represents an example mobile app user interface of UI 600 where a prospective provider may create a new account, or a participating provider may log in through the Sign In Module 61. The information provided by the prospective provider and participating provider are stored in the Service Provider Database 81. New Account Module 62 and Payment Gateway Module 67 serve the provider to receive new account information, including payment method to be used at time of service. As FIG. 5A of an example mobile app user interface of UI 600 represents. FIG. 5A depicts an example mobile app user interface of UI 600 where the participating provider is alerted of a pending request for service near by the location established through the Incoming Service Request Module 63 and Location module 66. Information about the participating client including service request location is displayed. Probability Module 65 and Provider capabilities Module 68 serves an AI algorithm to match a suitable request client-provider, allowing the AI algorithm to save historical data in an Event Database 84 to enhance the matching process. FIG. 5A represents an example mobile app user interface of UI 600 where the participating provider is able to track the pathway to the requested service location through the provider drives to location module 64. FIG. 5A represents an example mobile app user interface of UI 600 where a participating provider is alerted of a pending request for service near a predetermined location. Information about the participating client including service request location is displayed. If the alternative service is among the service requested, the destination for the alternative service is also displayed.

Figure 6:
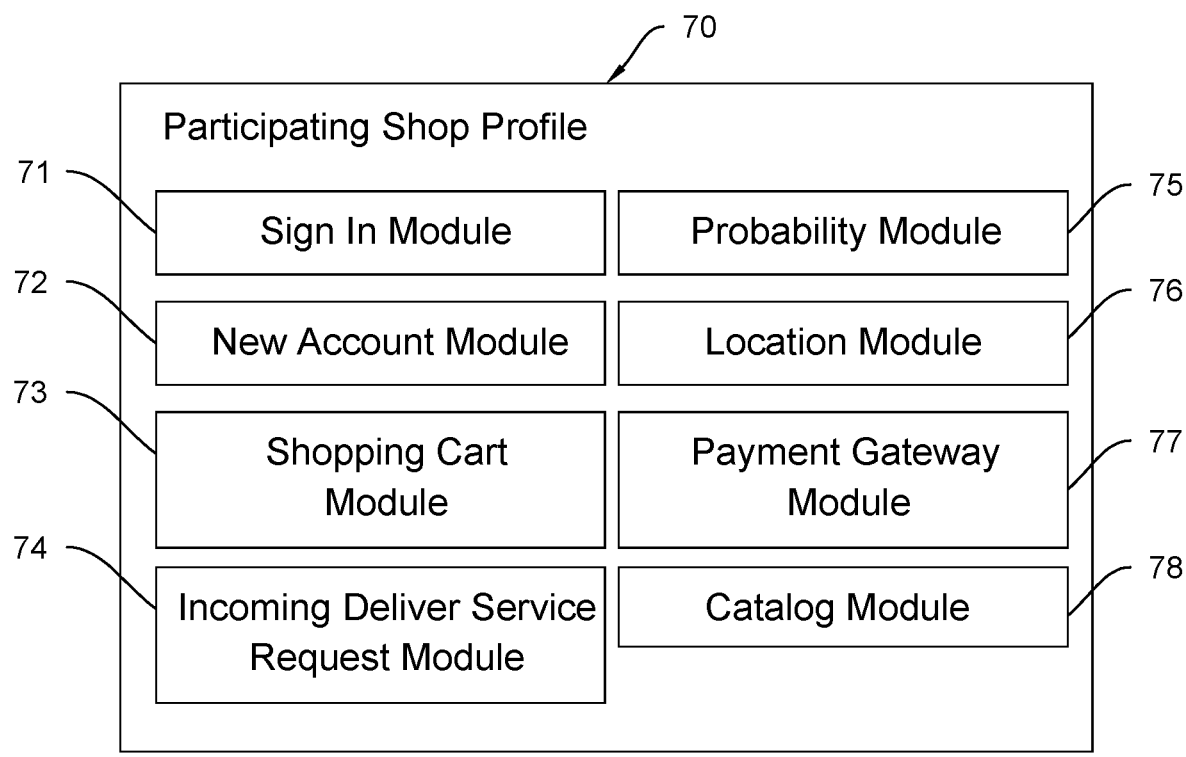
FIG. 6 is a representation of an overview of the modules comprising the Participating Shop Profile 70.
Figure 6A:
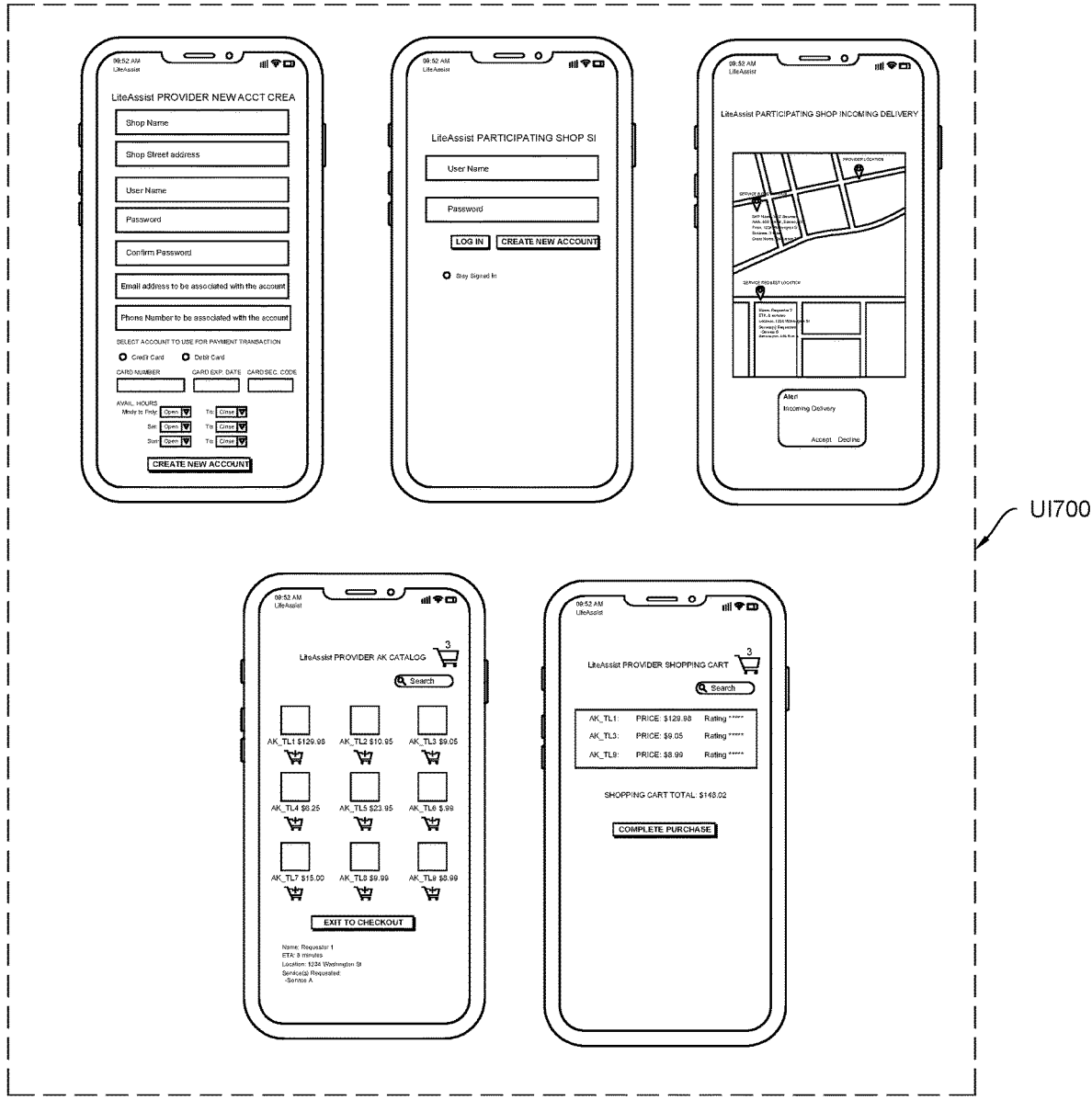
FIG. 6A represents a mobile app user interface UI 700 in accordance with an embodiment of the present invention 10.

As best observed in FIG. 6, Participating Shop Profile 70 integrates a Sign In Module 71, New Account Module 72, Shopping Cart Module 73, Incoming Deliver Service Request Module 74, Probability Module 75, Location Module 76, Payment Gateway Module 77, and a Catalog Module 78. FIG. 6A represents an example mobile app user interface of UI 700 where a prospective shop may create a new account, or a Participating Shop may log in through the Sign In Module 71. The information provided of both the prospective shop and the Participating Shop is stored and processed through the Participating Shop Database 89. FIG. 6A depicts an example mobile app user interface of UI 700 where the prospective shop owner enters new account information, including payment method to be used at time of transactions and available shop hours. This information is processed by the New Account module 72 and Payment Gateway Module 78. FIG. 6A represents an example mobile app user interface of UI 700 where the targeted Participating Shop for the alternative service is alerted of incoming delivery as soon as the service request is accepted by the participating provider through the Incoming Service Request Module 63. This request is processed by means of the Incoming Delivery Service Request Module 74. Probability Module 75 and Location Module 76 utilize the AI algorithm that relies on data extracted from the User database 86, Car specification database 83, Event database 84, Geographical correlation Database 82, and Artificial Intelligence database 85. This integration enables the processing of service requests originating from both participating clients and participating providers. The AI algorithm effectively matches the most appropriate participating shop with the capability to offer the necessary tools or spare parts required for addressing the specific service request. Crucial information about both participating client and participating provider is also displayed on FIG. 6A. FIG. 6A shows an example mobile app user interface of UI 700 where the participating provider may select the appropriated tool for service capability. This process relies on the Shopping Cart Module 73, Payment Gateway Module 78, and Catalog Module 78, allowing the participating shop to receive payment transactions using the same payment method information stored in the Participating Shop Database 89. FIG. 6A represents an example mobile app user interface of UI 700 where a list of all items in the participating provider's shopping cart along with the total cost for those items.

Database assembly 80 including Service Provider Database 81, Geographical Correlation Database 82, Car specification Database 83, Event Database 84, Artificial Intelligence Database 85, User Database 86, Password Database 87, Tools Database 88, and Participating Shop Database 89. In an exemplar embodiment, Service Provider Database 81 captures a range of information from the participating provider, such log in details, contact details, availability, skills, specialization and the like. Geographical correlation Database 82 draws upon location-based data, enabling geographical alignment between participating clients, participating providers, and participating shops. Car specification Database 83 stores participating client's car specifications, ensuring compatibility assessment during service requisitions. Event Database 84 records historical and ongoing service events, contributing to further data analysis. Event database 84 forms the basis for refining processes, enhancing service quality, and fostering continuous improvement. Artificial Intelligence Database 85 holds algorithms, patterns, models and the like that empowers the AI algorithm. Artificial Intelligence Database 85 enables the AI algorithm to make informed service recommendations and optimize matches between participating clients, participating providers, and participating shops. User Database 86 stores essential participating client data, encompassing a spectrum of client profiles. Password Database 87 stores individual passwords for participating clients, participating providers, and participating shops. Password Database 87 may be used for data protection. Tools Database 88 stores and catalogs tools, spare parts, and available tools from the assistance kit 29, ensuring accurate recommendations and allocations when Client service request module 53 sends a request. Participating Shop Database 89 stores essential information related to the participating shops such as inventory, participating shops profiles, tools' prices, capabilities, historical records and the like, empowering the AI algorithm to allocate services based on shops attributes.

In an exemplar embodiment of the present invention 10, the AI algorithm analyzes real-time data to connect participating clients with appropriate service providers based on the Database assembly 80, while also considering potential hazards or recurring issues based on geographical location. By leveraging historical data, the AI algorithm empowers participating providers with insights into common car problems for informed decision-making. Additionally, the AI algorithm identifies patterns in service requests withing certain geographical areas, thereby the system may also prevent/alert clients from potential recurrent issues reported in client's current geographical location. The system 10 using said prevention module 57 may display a list of suggested service providers from the Service Provider DB 81 that may have attended recurrent issues in the same area. Furthermore, the system 10 may be able to share identified patterns with local authorities.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

Example 1

The uses an AI algorithm and databases to match clients requesting roadside assistance with appropriate service providers. For this scenario, when a client requests help for running out of gas, the system's AI algorithm will leverage the geographical correlation database and event database to identify that there have been recent reports of flat tires in client's location. It will use this data to recommend a provider who not only has fuel to assist Tom, but also has the tools to help with potential tire issues, providing a more comprehensive service recommendation.

Example 2

The system uses historical data in the event database and artificial intelligence database to enable informed recommendations. For this scenario, the AI algorithm can search external data sources to identify common issues for the client's specific car make and model. It can also check the client's service history in the event database to see if they have had recurring issues recently. This historical data allows the algorithm to make tailored service recommendations when the client requests help Example 3

When a client requests help with a flat tire, the system will match her to capable nearby providers by comparing her request data to provider profiles and capabilities in the service provider database. Additionally, the AI algorithm can use aggregated location-based data in the geographical correlation database to identify that there have been multiple recent flat tires reported in client's area. It can report this pattern to local authorities via the communication network, demonstrating how the system can utilize data analytics to identify and assist with local transportation infrastructure issues.

What is claimed is:

1. A supplemental service recommendation system, comprising:
   a) a plurality of computerized devices in communication with a server via a network, the server contains a plurality of databases and at least one software, said plurality of computerized devices are capable of running said at least one software which includes a probability module that uses machine learning algorithms in connection with an artificial intelligence database to match service providers of a service providers database with members of a members database based on an assistance request made by the members using at least one user interface, said service providers having an assistance kit comprising tools which uses a wireless module in communication with said server by means of said network, said wireless module detects available tools in the assistance kit and communicates collected information to the server, said at least one software containing instructions that when read by the plurality of computerized devices, cause the system to:
      receive the service request from a member via a client interface, wherein said service request includes location data and required service;
      process said service request via said probability module to match the member with a service provider from the service providers based on the service request, historical data, available tools in the provider's assistance kit, and artificial intelligence algorithms, wherein the probability module verifies location data of the member and the service provider to authenticate that the service provider profile complies with the required service; and wherein a matched service provider receives said location data and service request from the member via a provider interface.

2. The system of claim 1, wherein the reporting module shares recurring regional issues patterns with local authorities by means of said communication network.

3. The system of claim 1, wherein the client interface includes a payment getaway module for the user to enter a payment method directly within said at least one software, said the payment getaway module enables direct payment from members to matched service providers.

4. The system of claim 1, wherein said artificial intelligence algorithms identify patterns in service request within a predetermined geographical area using a geographical correlation database and alerts the member by means of a prevention module running on the client interface.

5. The system of claim 1, wherein said assistance kit further includes at least one of an engine diagnostic tool, jumper cables, an air with pressure meter, a tire patch kit, a gas jug or a motor oil jug.

6. The system of claim 4, wherein the geographical correlation database comprises locations of members, service providers, and participating shops.

7. The system of claim 1, further comprising a participating shop interface wherein a participating shop receives notifications of incoming delivery service requests via an incoming delivery service request module.

8. The system of claim 7, wherein the participating shop interface further comprises a shopping cart module and payment gateway module enabling the service provider to select tools required for the service request and make payment.

9. The system of claim 8, wherein the shopping cart module, payment gateway module, and catalog module allow the participating shop to receive payment transactions using payment method information stored in a participating shop database.

10. The system of claim 9, wherein the participating shop database stores inventory, shop profiles, tools prices, shop capabilities, and historical records, and wherein this data enables the probability module to match service requests with the most appropriate participating shop.

* * * * *